(12) United States Patent
Beale

(10) Patent No.: US 11,125,268 B2
(45) Date of Patent: Sep. 21, 2021

(54) COMPOSITE STRUCTURAL COMPONENT WITH CAPTIVE MECHANICAL JOINT

(71) Applicant: Crompton Technology Group Limited, West Midlands (GB)

(72) Inventor: Tom Beale, Faringdon (GB)

(73) Assignee: CROMPTON TECHNOLOGY GROUP LIMITED, West Midlands (GB)

( * ) Notice: Subject to any disclaimer, the term of this patent is extended or adjusted under 35 U.S.C. 154(b) by 468 days.

(21) Appl. No.: 15/909,217

(22) Filed: Mar. 1, 2018

(65) Prior Publication Data

US 2018/0283424 A1 Oct. 4, 2018

(30) Foreign Application Priority Data

Mar. 31, 2017 (EP) .................................... 17164438

(51) Int. Cl.
*F16B 7/04* (2006.01)
*E04C 3/28* (2006.01)
(Continued)

(52) U.S. Cl.
CPC ............ *F16C 3/026* (2013.01); *B29C 65/562* (2013.01); *B29C 65/64* (2013.01);
(Continued)

(58) Field of Classification Search
CPC ... B29C 65/562; B29C 65/64; B29C 66/1122; B29C 66/301; B29C 66/534;
(Continued)

(56) References Cited

U.S. PATENT DOCUMENTS 3,492,768 A 2/1970 Schuster
3,850,722 A * 11/1974 Kreft ...................... F16C 3/026
156/172

(Continued)

FOREIGN PATENT DOCUMENTS

EP 2711099 A1 3/2014
EP 3133298 A1 2/2017
(Continued)

OTHER PUBLICATIONS

"Epoxy resins modified with elastomers and surface-modified silica nanoparticles." Sprenger, Stephan. Polymer. 54 Ed. p. 4790-4797. Jun. 18, 2013.*

(Continued)

*Primary Examiner* — Josh Skroupa
(74) *Attorney, Agent, or Firm* — Cantor Colburn LLP

(57) ABSTRACT

A composite structural component comprises an elongate member made of a polymer matrix composite material. The elongate member comprises a main portion extending along an axis A and an end portion with an inner surface extending from the main portion to an open end of the member. The composite structural component also comprises an end fitting forming a mechanical joint with the end portion, the end fitting comprising an internal portion positioned captive within the elongate member in contact with the inner surface of the end portion; an external portion positioned in contact with an outer surface of the end portion; and an adjustable fastener extending axially between the internal and external portions to clamp the end portion between the internal and external portions. The inner surface of the end portion in contact with the internal portion extends towards the axis A at an increasing angle to the axis A.

19 Claims, 3 Drawing Sheets

(51) Int. Cl.
*B29C 65/00* (2006.01)
*B29D 99/00* (2010.01)
*F16C 3/02* (2006.01)
*B29C 65/64* (2006.01)
*B29C 70/86* (2006.01)
*B29C 65/56* (2006.01)
*F16C 7/02* (2006.01)
*B29L 31/06* (2006.01)

(52) U.S. Cl.
CPC ........ *B29C 66/1122* (2013.01); *B29C 66/301* (2013.01); *B29C 66/534* (2013.01); *B29C 66/721* (2013.01); *B29C 66/72141* (2013.01); *B29C 70/86* (2013.01); *B29D 99/0046* (2013.01); *E04C 3/28* (2013.01); *F16B 7/0406* (2013.01); *F16C 7/026* (2013.01); *B29C 66/7212* (2013.01); *B29L 2031/06* (2013.01)

(58) Field of Classification Search
CPC ............ B29C 66/721; B29C 66/72141; B29C 66/7212; B29C 70/86; B29D 99/0046; B29L 2031/06; B64C 2001/0072; E04C 3/28; F16B 7/0406; F16C 3/023; F16C 3/026; F16C 7/026; Y10T 403/57; Y10T 403/5753; Y10T 403/5793
USPC ................. 403/300, 308, 314; 464/181, 183
See application file for complete search history.

(56) References Cited

U.S. PATENT DOCUMENTS

| | | | | |
|---|---|---|---|---|
| 4,353,268 A | * | 10/1982 | Picard | F16C 7/026 74/587 |
| 4,411,114 A | * | 10/1983 | Wurtinger | F16C 7/026 403/267 |
| 4,848,957 A | * | 7/1989 | Umeda | F16C 7/026 403/374.4 |
| 5,670,183 A | | 9/1997 | Weihs et al. | |
| 6,230,922 B1 | * | 5/2001 | Rasche | F17C 1/16 220/586 |
| 6,485,218 B1 | | 11/2002 | Martinovsky | |
| 10,532,518 B2 | * | 1/2020 | Gurvich | F16C 7/026 |

FOREIGN PATENT DOCUMENTS

| | | |
|---|---|---|
| FR | 2942161 A | 8/2010 |
| GB | 2260961 A | 5/1993 |
| IN | 5341CHE2013 A | 6/2016 |
| WO | 2012146213 A1 | 11/2012 |

OTHER PUBLICATIONS

CA Office Action for Application No. 2993390, dated Jun. 4, 2019, 6 pages.
Extended European Search Report for International Application No. 17164438.8 dated Sep. 22, 2017, 8 pages.

* cited by examiner

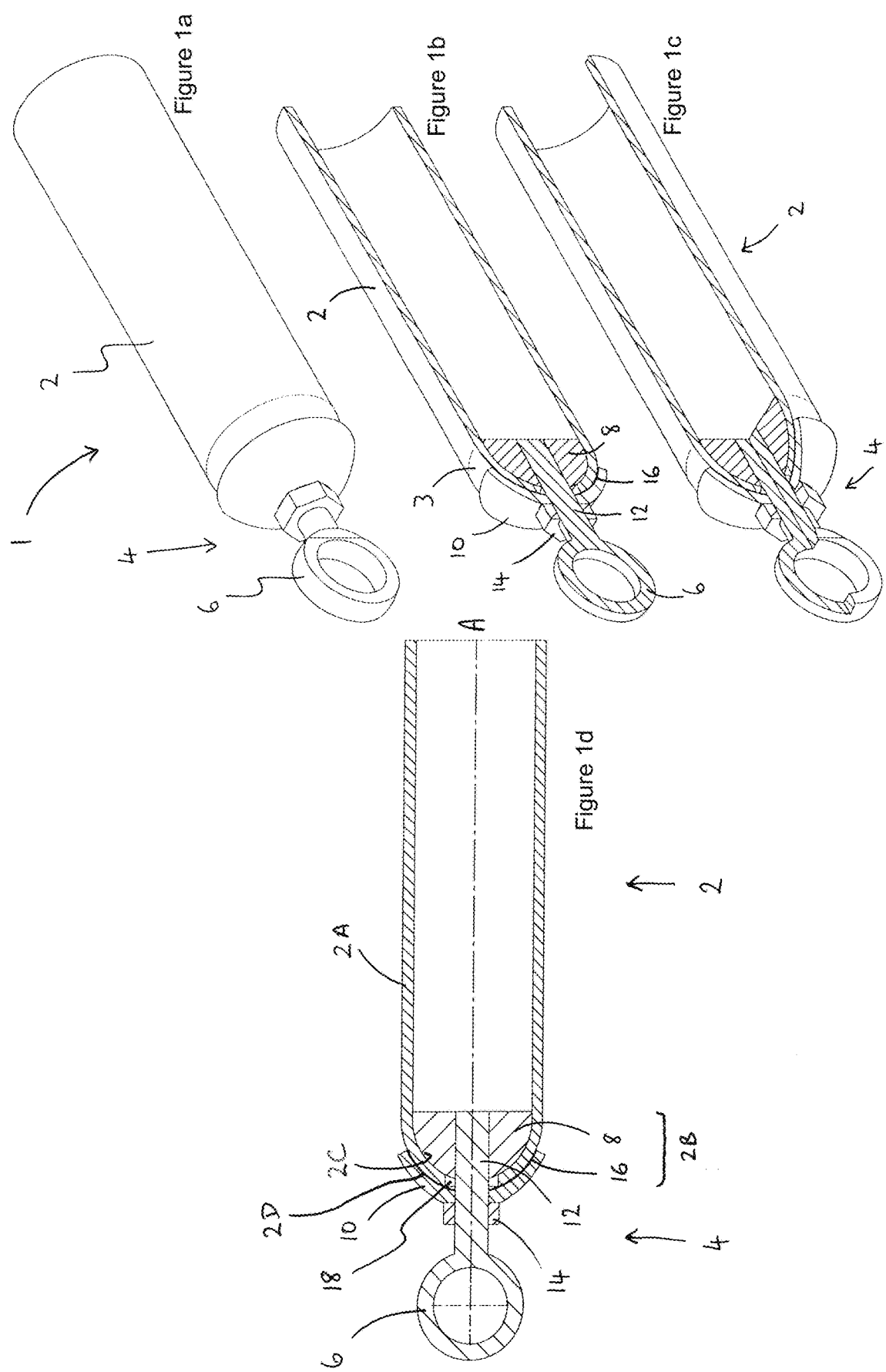

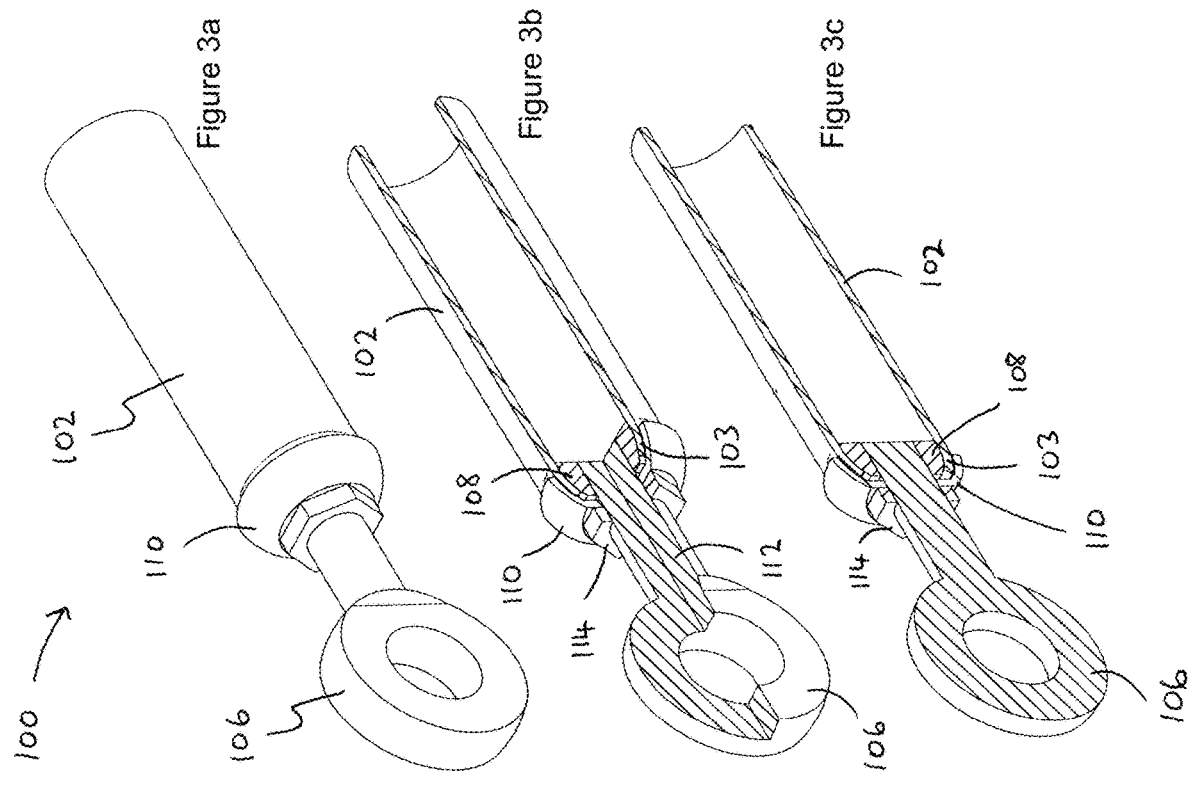
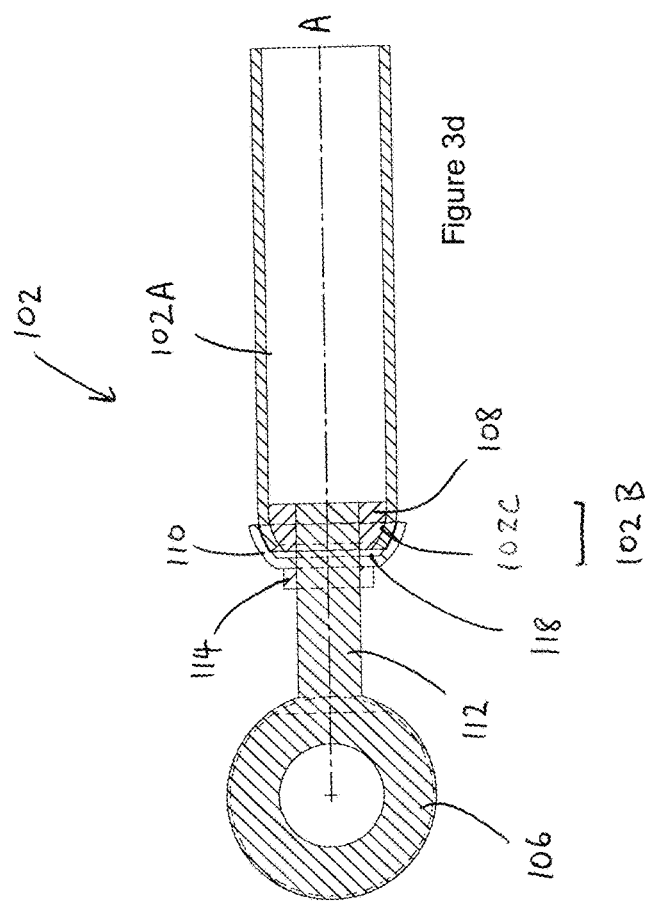

COMPOSITE STRUCTURAL COMPONENT WITH CAPTIVE MECHANICAL JOINT

FOREIGN PRIORITY

This application claims priority to European Patent Application No. 17164438.8 filed Mar. 31, 2017, the entire contents of which is incorporated herein by reference.

TECHNICAL FIELD

The present disclosure relates to mechanical joints for composites, in particular mechanical joints for composite structural components made of a polymer matrix composite material. This disclosure is concerned with captive mechanical joints that may be used to transmit axial loads to/from a composite structural component.

BACKGROUND

Composite structural components are typically made of a polymer matrix composite material, often a fibre-reinforced polymer matrix composite material using glass and/or carbon fibre reinforcement, e.g. carbon fibre reinforced polymer (CFRP). Composite structural components offer the opportunity for lightweight and cost effective load transmission solutions. The largest benefits are often achieved when the load path and geometry are simple. Axial load transmission components, for example beams, rods, tubes and struts, are ideal candidates for polymer matrix composite material and such composite structural components are increasingly being used on commercial aircraft in addition to automotive and construction industries. These composite structural components generally require an end fitting having a complex form to interface with other components. Metals are efficient in terms of weight and cost for forming an end fitting having a complex geometry. However, joining a composite structural component to a metallic end fitting poses significant challenges, especially in the aerospace industry where the joint must be formed in a robust and certifiable manner.

Joining an end fitting to a composite structural component requires a reliable mechanism to transfer the axial load into the composite structural component. A mechanical joint may be preferred at least for aerospace certification purposes. However mechanical joints can often suffer from the problem of fretting and wear due to relative movement between the metal end fitting and the relatively soft material of the composite structural component. Sophisticated manufacturing capability may also be required to make a suitable mechanical joint.

The present disclosure seeks to provide a mechanical joint for a composite structural component which may not experience wear and damage from fretting. The present disclosure also seeks to provide a mechanical joint for a composite structural component which may have an increased strength to weight ratio and an increased strength to cost ratio.

SUMMARY

According to the present disclosure there is provided a composite structural component comprising: an elongate member made of a polymer matrix composite material, the elongate member comprising a main portion extending along an axis and an end portion with an inner surface extending from the main portion to an open end of the member; and an end fitting forming a mechanical joint with the end portion, the end fitting comprising: an internal portion positioned captive within the elongate member in contact with the inner surface of the end portion; an external portion positioned in contact with an outer surface of the end portion; and an adjustable fastener extending axially between the internal and external portions to clamp the end portion between the internal and external portions; wherein the inner surface of the end portion in contact with the internal portion extends towards the axis at an increasing angle $\theta$ to the axis.

In such a captive mechanical joint, the end portion of the elongate member is constrained between the internal and external portions of the end fitting. During service, tension delivered through the end fitting is transferred to the end portion through the captive internal portion while compression is delivered from the end fitting to the end portion through the external portion. Conventional mechanical joints rely on frictional resistance to prevent sliding between a composite material member and an end fitting. It will be appreciated that the increasing angle of the inner surface means that is curved rather than being tapered and hence the mechanical joint depends less on frictional resistance to prevent sliding or relative movement between the end fitting and the end portion made of a polymer matrix composite material, thus avoiding damage and wear from fretting, especially under cyclic loading. The greater the curvature of the inner surface, the smaller the reaction force at the inner surface when an axial load is applied to the end fitting. It is an advantage of the present disclosure that the mechanical joint does not require any form of bonding (e.g. adhesive), nor a complex mechanical form for the end fitting in order to deliver load to the composite structural component. Sophisticated manufacturing capability is not required to manufacture the key components of the mechanical joint. For example, there can be significantly less composite material waste from manufacturing as compared with existing metal-to-composite joints as composite material does not need to be removed following the lamination process.

The Applicant has recognised that it is beneficial to reduce the size/length of the end fitting so as to minimise its weight contribution to the composite structural component. However, typical manufacturing processes for an elongate composite member, for example filament winding, are not suited to a high taper angle. For example, a conical end portion of a tubular composite member is not tapered at an angle of more than 25°, and typically not tapered at an angle of more than 15°, because the filaments used to make the polymer matrix composite material will slip off high angled surfaces during manufacture. The Applicant has appreciated that these issues may be avoided when the inner surface of the end portion has an increasing angle to the axis, in other words the inner surface is at least partially curved in profile, when viewed in a plane perpendicular to the axis. The composite material may be deposited more easily on a curved surface than a tapered surface having a constant angle, especially when using a filament winding process. Preferably the angle $\theta$ to the axis increases to a maximum of at least 30°, 35° or 45° for the inner surface of the end portion in contact with the internal portion. In some examples, the angle $\theta$ to the axis may increase to a maximum of up to 80°, 85° or 90° for the inner surface of the end portion in contact with the internal portion. In such examples the mechanical joint may not rely on any frictional resistance to prevent relative movement, as a service load along the axis is then perpendicular to the inner surface. Significant mass savings can be made compared to a conventional joint.

In addition, or alternatively, the adjustable fastener extending axially between the internal and external portions can be used to preload the end portion. For example, the internal and external portions can be clamped together so that the end portion is preloaded with a through-thickness compressive force, which results in hoop stress in the partially curved end portion. The joint may therefore be preloaded to a practical clamping load, since the normal component is in line with the service load when the joint is used for axial force transmission. Thus in at least some examples the fastener applies a preload of through-thickness compression to the end portion (which is clamped between the internal and external portions). Because the end portion is preloaded with a through-thickness compression, the netradial stress in the composite material of the elongate member is lowered when a tensile stress is applied by an axial load being transmitted by the end fitting, resulting in a very high strength to weight ratio for the joint. The clamping preload may be of greater magnitude than the axial tensile or compressive loads that the component experiences in use and therefore there may be no relative movement between the surfaces of the end portion and the end fitting which could cause fretting during service. This can allow the curved profile of the end portion to be chosen so as to reduce the size and weight of the end fitting.

In some examples, the inner surface of the end portion in contact with the internal portion extends towards the axis at a continuously increasing angle $\theta$ to the axis. The inner surface may be substantially domed. The end portion of the composite structural component may have any suitable three-dimensional shape that is at least partially curved in a plane perpendicular to the axial direction to form the inner surface that extends towards the axis at an increasing angle $\theta$ to the axis. The end portion may comprise a three-dimensional shape that extends in more than one direction that is perpendicular to the axis. In order to achieve uniform force distribution, preferably the end portion is axisymmetric. For example, the end portion may comprise an axisymmetric dome. The dome may be hemispherical, torospherical, or take any other three-dimensional curved shape that extends between surfaces which are angled relative to one another.

The external portion of the end fitting is positioned in contact with an outer surface of the end portion that is preferably opposite the inner portion that extends at an increasing angle $\theta$ to the axis. In some examples, the outer surface of the end portion may extend at substantially the same increasing angle $\theta$ to the axis as the inner surface. The end portion may therefore have a substantially constant thickness. In some examples, the outer surface may follow a different profile or contour to the inner surface. This may allow variation in the thickness of the end portion.

In order for the end fitting to transmit load evenly into the end portion of the composite structural component, it is preferable that the internal portion and/or the external portion of the end fitting is at least partially shaped to match the surfaces of the end portion. For example, the internal portion of the end fitting may have an outer surface that is shaped e.g. domed to match the inner surface of the end portion. In addition, or alternatively, the external portion of the end fitting may have an inner surface that is shaped e.g. domed to match the outer surface of the end portion. In other words, the internal portion of an end fitting may be at least partially curved to form an outer surface that extends at an increasing angle $\theta$ to the axis and/or the external portion of an end fitting may be at least partially curved to form an inner surface that extends at an increasing angle $\theta$ to the axis.

In various examples, the internal portion and/or the external portion of the end fitting may be made of a material that is stiffer than the polymer matrix composite material of the elongate member. For example, the internal portion and/or the external portion may be made of metal. It will be appreciated that service loads are transmitted from the end fitting to the elongate member by the external portion and internal portion being in contact with, respectively, the outer and inner surfaces of the end portion. The internal portion supports the composite end portion when the joint is loaded in compression, and the external portion supports the composite end portion when the joint is loaded in tension. It may be more important for the external portion to be made of metal than the internal portion. The external portion transmits a load applied to the end fitting in compression and restrains the composite end portion from bending when a load is applied to the end fitting in tension.

It is desirable to avoid any contact between the end fitting and the open end of the elongate member, as forces applied to an end face can weaken the composite material and potentially result in delamination, especially when the end fitting is made of a stiffer material. In some examples the end portion defines an end face in a plane perpendicular to the inner surface and the end face is arranged in a space between the internal portion and external portion of the end fitting. The end face may extend 360° around the open end of the elongate member. The space between the internal portion and external portion may also extend 360° around the open end of the elongate member. The composite material of the elongate member is protected by leaving an air gap between the open end face of the end portion and the captive end fitting.

In various examples the end portion of the composite elongate member may be filament wound directly onto the internal portion of the end fitting. After curing the elongate member, the external portion of the end fitting can then be put into position and the fastener added to complete the composite structural component. Such a manufacturing process is described further below.

The end fitting comprises three main components: the internal portion, the external portion, and the adjustable fastener extending axially between the internal and external portions. In a set of examples the fastener may comprise a screw e.g. extending through a threaded bore in both the internal and external portions. Further preferably the fastener may comprise a nut, for example enabling the internal and external portions to be tightened together with the composite material end portion clamped in between. In at least some examples the external portion may comprise a washer arranged between the nut and the outer surface of the end portion, for example to spread the load. As is disclosed above, the washer may be at least partially shaped to match the outer surface of the end portion. For example, the washer may comprise an axisymmetric dome, e.g. shaped in the same way as described above in relation to the composite material end portion. Other examples are contemplated wherein the adjustable fastener is a fastener other than a screw and nut.

More generally, the external portion of the end fitting is preferably shaped so as to spread the load applied by the end fitting across the surface of the end portion, preferably across an area that is supported by the captive internal portion. The internal portion and/or the external portion may extend towards the axis at an angle $\theta$ that increases to a maximum value which is greater than the maximum angle $\theta$ of the end portion to the axis. For example, the internal portion and/or the external portion may extend towards the axis at an angle θ that increases to a maximum of 70°, 75°, 80°, 85° or 90°. In other words, the internal portion and/or the external portion may substantially close the open end of the elongate composite member.

Regardless of the form taken by the fastener, in various examples the end fitting may further comprise a gasket arranged between the external portion and the outer surface of the end portion. The gasket may provide a seal between the surfaces, allowing for less than perfect mating, especially when one or both of the surfaces may include irregularities. This can be particularly important because the end portion is made of a polymer matrix composite material and typical manufacturing techniques, such as filament winding, can leave an irregular surface finish. The gasket may be at least partially shaped to match the outer surface of the end portion. In examples where the end portion comprises an axisymmetric dome, the gasket may also take the form of an axisymmetric dome. In at least some examples the gasket may comprise an elastomeric e.g. silicone seal.

The Applicant has realised that it may be beneficial to provide a layer of elastomeric or rubber material between the external portion and the outer surface of the composite end portion, not only to assist with clamping, but also to resist relative movement between the surfaces when an axial load is applied to the component. This may also be useful between the internal portion and the inner surface of the composite end portion. In at least some examples the component may further comprise a layer of elastomeric or rubber material between the external portion and the outer surface of the composite end portion and/or between the internal portion and the inner surface of the composite end portion. Such arrangements may increase the frictional coefficient and hence further act to mitigate relative movement between the end portion and internal/external potions of the end fitting.

Fretting is often a problem when connecting a metal end fitting to a composite structural component. In various examples the end fitting is a metal component. This means that preferably at least the main components of the end fitting, the internal portion, the external portion, and the adjustable fastener, are made of a metallic material. The end fitting may be any suitable mechanical attachment, for example a rod end, a clevis, a socket. A mechanical attachment such as a clevis may include an eye fitment. The end fitting may itself contain a second assembly, depending on the application (i.e. custom fit for adjustability). The end fitting may include a thread for screw attachment, or a bayonet fitting, for attaching the joint to another component.

The composite structural component may have a wall thickness that is uniform or non-uniform in the main portion and the end portion. For example, the end portion may be thicker than the main portion. This may result from a manufacturing process, such as filament winding to form a domed end portion. Thicker walls in the end portion may also assist with absorbing a preload applied by the end fitting.

The composite structural component may comprise an end portion and a mechanical joint as disclosed herein at one or both ends of the main portion. Of course the other end of the main portion may be attached to an end fitting by a different mechanical joint. The main portion may have an inner surface that extends at an angle of 0° relative to the axis. The main portion of the composite structural component may be substantially cylindrical. In one set of examples the main portion may comprise a hollow tube or beam. The main portion may extend between a pair of end portions. The main portion between the end portions may have a constant internal radius. The composite structural component is preferably a tubular component. The main portion and/or the end portion of the composite structural component may be substantially axisymmetric. One or more of these features can facilitate manufacture of the joint using filament winding processes, as is discussed further below.

It will be understood that the mechanical joint comprises an end portion of the composite structural component. Other portions of the composite structural component, which may not be in axial alignment with the end portion and/or main portion, are not described in detail in this disclosure. The other portions of the composite structural component may optionally include one or more further components mounted internally or externally, for example an internal sleeve of metal or rubber.

A composite structural component as disclosed herein may be a strut (e.g. designed to resist longitudinal compression) or a rod (e.g. designed to resist longitudinal tension). In some preferred examples the composite structural component is a piston rod, e.g. a piston rod for a hydraulic or electric actuator. The elongate member may take the form of any axial load-bearing beam or tube.

In a composite structural component as disclosed herein, the elongate member may be made of any suitable polymer matrix composite material. The polymer matrix composite material is preferably a fibre-reinforced polymer matrix composite material, e.g. comprising glass or carbon fibres. In many examples the polymer matrix composite material is carbon fibre reinforced polymer (CFRP). Such materials are inherently corrosion resistant and provide a large weight saving and improved fatigue performance.

The elongate member may be made using any suitable manufacturing technique. A fibre-reinforced polymer matrix composite material may be formed by braiding, automated fibre placement (AFP), or prepreg wrap techniques. However in preferred examples the elongate member is a filament wound structure. Filament winding techniques are particularly well-suited for making tubular members from carbon-fibre reinforced polymer (CFRP).

A filament wound elongate member may be formed so as to optimise its axial strength at least in the main portion. In a typical filament winding process for an axial force transmission component, glass or carbon fibres are wound around a mandrel in a helical fashion at a low angle, e.g. 8-15°, in at least some of the layers. Accordingly an elongate member as disclosed herein, or a least the main portion thereof, may be a filament wound structure comprising one or more layers of glass or carbon fibre at angles of 8-15° to the longitudinal axis of the elongate member. The elongate member, or a least the main portion thereof, may additionally comprise one or more layers of glass or carbon fibre wound at higher angles to provide hoop strength. For example, one or more layers of glass or carbon fibre wound at angles of at least 75° or 80° to the longitudinal axis of the elongate member. It will be appreciated that the main portion extends along a longitudinal axis while the end portion extends towards the longitudinal axis at an increasing angle θ, in other words the main portion has a straight profile while the end portion has a curved profile. The end portion of the elongate member, as compared to the main portion, may therefore comprise more layers of glass or carbon fibre wound at angles of at least 75° or 80° to the longitudinal axis of the elongate member. In many examples the end portion has a domed shape and may be a filament wound structure comprising multiple layers wound at different angles, for example one or more layers of low angle fibre (for example fibre wrapped at 8-20°) and one or more layers of high angle fibre (for example fibre wrapped at 70-89°).

According to the present disclosure there is further provided a method of forming a mechanical joint in a composite structural component comprising an elongate member made of a polymer matrix composite material, the elongate member comprising a main portion extending along an axis and an end portion with an inner surface extending from the main portion to an open end of the member, the method comprising: providing an internal portion of an end fitting with an outer surface extending towards the axis at an increasing angle θ to the axis; forming the inner surface of the end portion to extend towards the axis at the increasing angle θ to the axis, in contact with the outer surface of the internal portion, so that the internal portion is positioned captive within the elongate member; providing an external portion of the end fitting in contact with an outer surface of the end portion; and tightening an adjustable fastener that extends axially between the internal and external portions to clamp the end portion between the internal and external portions.

In such a method, the end portion of the composite elongate member is formed around the outer surface of the internal portion and the external portion of the end fitting is fastened in contact with an outer surface of the end portion, such that an axial load can be transmitted from the end fitting to the end portion in both tension and compression. As is described above, the step of tightening the fastener may apply a preload of through-thickness compression to the end portion. The method may further comprise: setting the preload so as to exceed the expected axial loads for the component during service.

The step of forming the inner surface of the end portion in contact with the outer surface of the internal portion may comprise positioning the internal portion inside the end portion of a pre-made elongate member, e.g. the internal portion and the end portion having being made to have matching surface profiles. However, manufacturing tolerances are likely to prevent the surfaces from mating exactly and this can result in relative movement between them when the joint is loaded. In a set of examples, forming the inner surface of the end portion in contact with the outer surface of the internal portion may comprise winding reinforcing (e.g. glass or carbon) fibres or filaments around the internal portion. For example, the internal portion may comprise an axisymmetric dome and the end portion may be formed as an axisymmetric dome. Such a winding process may involve multiple layers wound at different angles, for example winding one or more layers of low angle fibre (for example fibre wrapped at 8-20°) and one or more layers of high angle fibre (for example fibre wrapped at 70-89°).

It is an advantage of methods disclosed herein that the elongate member may be filament wound around the internal portion of the end fitting in a single manufacturing process. For example, the internal portion may be provided on a mandrel and the main portion formed by winding reinforcing (e.g. glass or carbon) fibres or filaments around the mandrel.

The elongate member of the composite structural component may be filament wound and cured in a first manufacturing stage. After curing the elongate member, the external portion of the end fitting can then be put into position and the fastener added to complete the joint. In other examples, the external portion of the end fitting can be put into position prior to curing the elongate member, and optionally the adjustable fastener put into position also. The end fitting can therefore be used to apply compaction pressures during the curing process to improve the laminate quality of the composite elongate member. In a final manufacturing stage, the fastener may be tightened to clamp the end portion between the internal and external portions.

BRIEF DESCRIPTION OF THE DRAWINGS

One or more non-limiting examples will now be described, by way of example only, and with reference to the accompanying figures, in which:

FIGS. 1a-1d show various views of a mechanical joint a composite structural component according to an example of the present disclosure;

FIGS. 3a-3d show various views of a mechanical joint in a composite structural component according to another example of the present disclosure.

DETAILED DESCRIPTION

Figure 2A:
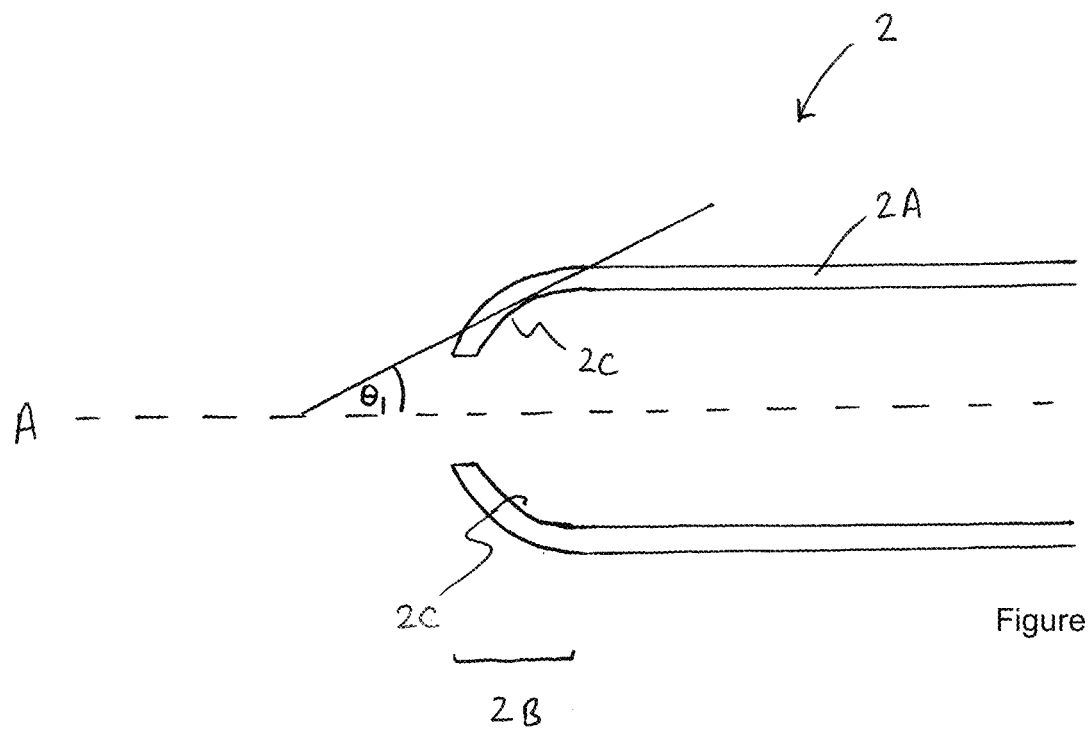
FIGS. 2a-2b schematically demonstrate how an inner surface extends towards an axis at an increasing angle to the axis.

FIG. 1a provides a perspective view of a composite structural component 1 comprising an elongate member 2 made of CFRP composite material, in this example a hollow cylindrical rod, with a mechanical joint 4 at one end. The other end of the rod 2 is not shown, although it may also have a mechanical joint 4. The mechanical joint 4 comprises a metal end fitting 6, 8, 10, shown here as comprising a rod end, attached to an end portion 2B of the rod 2. FIGS. 1b and 1c provide cutaway views of the rod 2 and its mechanical joint 4. FIG. 1d provides a side cross-sectional view. From these various views it can be seen that the end fitting 6 comprises a captive internal portion 8, an external washer portion 10, and a fastener comprising a screw 12 and a nut 14. The tubular rod 2 comprises a main portion 2A and the end portion 2B seen here at one end. The other end of the tubular rod 2, not shown, may also have an end portion 2B with an end fitting 6, 8, 10.

In this example the captive internal portion 8 takes the form of a solid axisymmetric dome. The composite material of the end portion 2B is formed around the captive internal portion 8 in the form of an axisymmetric domed shell. The end portion 2B has a domed inner surface 2C in contact with the outer surface of the internal portion 8. It can be seen that the external washer portion10 takes the form of a hollow axisymmetric dome so as to match the outer surface 2D of the end portion 2B. The external washer portion10 and captive internal portion 8 each comprise a threaded bore for the screw 12 to pass through. The nut 14 is tightened against the outer surface of the washer portion 10. In addition, in this example an optional elatomeric or rubber gasket 16 (e.g. silicone) is positioned between the external washer portion 10 and the outer surface 2D of the end portion 2B. In addition, or alternatively, an optional elatomeric or rubber gasket may be positioned between the captive internal portion 8 and the inner surface 2C of the end portion 2B. This can increase the frictional coefficient and hence further act to mitigate relative movement between the composite material of the rod 2 and the internal/external potions 8, 10 of the metal end fitting 6.

It will be appreciated that the end portion 2B of the composite material rod 2 is clamped between the internal portion 8 and external portion 10 of the end fitting 6, with the normal component of the clamping force in line with an axial service load. During service, tension delivered through the end fitting 6 is transferred to the composite material end portion 2B through the captive internal portion 8. In compression, the load is delivered through the external washer 10 to the composite material end portion 2B. The mechanical joint 4 does not need to rely on an adhesive or other permanent bonding to transfer loads or avoid fretting (although adhesive or other types of bonding could be added if desired).

The cross-sectional view of FIG. 1d shows that there is a gap 18 between the end face of the end portion 2B and the end fitting 6. This ensures that the composite material of the end portion 2B does not come into contact with the threaded surface of the screw 12.

Figure 2B:
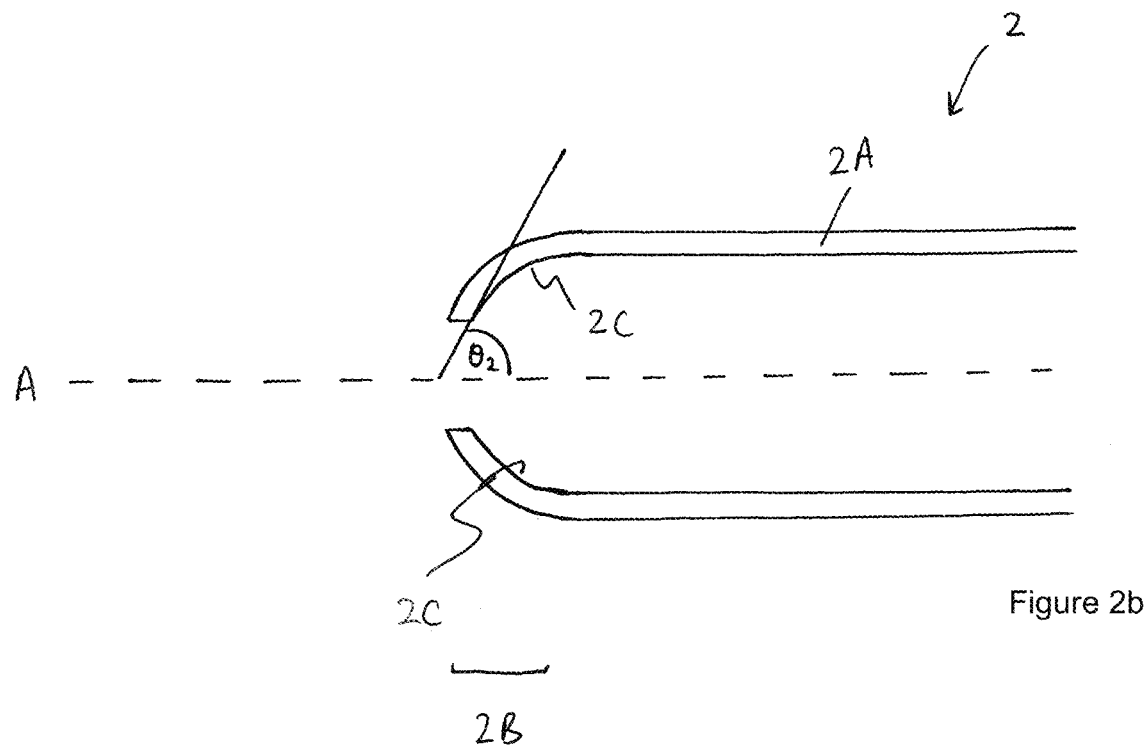

It can be seen from FIGS. 2a and 2b how the domed end portion 2B has an inner surface 2C that extends towards the axis A of the elongate member 2 at an increasing angle θ to the axis A. In FIG. 2a the end portion 2B is starting to curve inwardly from the inner surface of the main portion 2A, which extends parallel to the longitudinal axis of the rod 2. In FIG. 2a the inner surface 2C extends towards the axis A with a tangent to the surface 2C defining an angle θ1 that is less than 45°. In FIG. 2b the inner surface 2C extends further towards the axis A with a tangent to the surface 2C defining an angle θ2 that is more than 45°. The angle θ may increase up to a maximum of almost 90°. However, it can be seen that the domed end portion 2B does not extend fully to intersect the axis at 90° so as to leave the gap 18 seen in FIG. 1.

FIG. 3a provides a perspective view of another composite structural component 100 comprising an elongate member i.e. hollow rod 102 and an end fitting 106 at one end. The other end of the rod 102 is not shown. A mechanical joint is formed in substantially the same way as described above in relation to FIGS. 1 and 2. In this example, it can be seen that the end portion 102B is also partially curved but does not extend as far towards the axis of the rod as in the previous example. The inner surface of the end portion 102B extends towards the axis with a tangent to the surface defining an angle θ that increases up to a maximum of about 35° or 45°. The external washer portion 110 matches the partially domed end portion 102B by being curved at its periphery, but now a central area of the washer portion 110 is flat. The flattened part of the washer portion 110 receives the nut 114 that engages with the threaded bore 112 of the end fitting 106 so that the end portion 102B can be clamped between the external washer portion 110 and a captive internal portion 108. The captive internal portion 108 takes the form of a truncated axisymmetric dome. As before, a gap 118 is left between the end face of the end portion 102B and the end fitting 106.

When an axial load is applied to the end fitting 6 in the example of FIG. 1, the fully domed end portion 3 experiences a tensile or compressive force in a radial direction that is almost in line with the axis. This means that there is a negligible reaction force having a component along the inner/outer surface in contact with the internal/external portion 8, 10 and the mechanical joint does not depend on frictional resistance to sliding between the end fitting 6 and the end portion 3 of the composite material rod 2, thus eliminating fretting wear. When an axial load is applied to the end fitting 106 in the example of FIG. 3, the partially domed end portion 102B experiences a tensile or compressive force with a reaction force having a component along the inner/outer surface in contact with the internal/external portion 108, 110. The mechanical joint may therefore rely on a degree of frictional resistance to relative movement; however, this is reduced as compared to a tapered surface that has a lesser angle of 20° or 25° to the axis.

The invention claimed is:

1. A composite structural component comprising:
   an elongate member made of a polymer matrix composite material, the elongate member comprising a main portion extending along an axis and an end portion with an inner surface extending from the main portion to an open end of the member; and
   an end fitting forming a mechanical joint with the end portion, the end fitting comprising:
   an internal portion positioned captive within the elongate member in contact with the inner surface of the end portion;
   an external portion positioned in contact with an outer surface of the end portion; and
   a separate adjustable fastener extending axially between the internal and external portions and comprising a part which is tightened against an external surface of the external portion opposite the outer surface of the end portion so as to clamp the end portion between the internal and external portions with a clamping force having a normal component in line with the axis;
   wherein the inner surface of the end portion in contact with the internal portion extends towards the axis at an increasing angle θ to the axis.

2. A composite structural component according to claim 1, wherein the angle θ to the axis increases to a maximum of at least 30° for the inner surface of the end portion in contact with the internal portion.

3. A composite structural component according to claim 1, wherein the angle θ to the axis increases to a maximum of up to 90° for the inner surface of the end portion in contact with the internal portion.

4. A composite structural component according to claim 1, wherein the end portion comprises an axisymmetric dome.

5. A composite structural component according to claim 1, wherein the fastener applies a preload of through-thickness compression to the end portion.

6. A composite structural component according to claim 1, wherein the end portion defines an end face in a plane perpendicular to the inner surface and the end face is arranged in a space between the internal portion and external portion of the end fitting.

7. A composite structural component according to claim 1, wherein:
   the internal portion of the end fitting has an outer surface that is shaped to match the inner surface of the end portion; and/or
   the external portion of the end fitting has an inner surface that is shaped to match the outer surface of the end portion.

8. A composite structural component according to claim 1, wherein the end portion of the elongate member is filament wound directly onto the internal portion of the end fitting.

9. A composite structural component according to claim 1,
   wherein the fastener comprises a screw and a nut, and
   wherein the external portion comprises a washer arranged between the nut and the outer surface of the end portion.

10. A composite structural component according to claim 1, further comprising a layer of elastomeric or rubber material between the external portion and the outer surface of the composite end portion and/or between the internal portion and the inner surface of the composite end portion.

11. A composite structural component according to claim 1, wherein the end fitting is a metal component.

12. A composite structural component according to claim 1, wherein the elongate member is an axial load-bearing beam or tube.

13. A composite structural component according to claim 1, wherein the angle $\theta$ to the axis increases to a maximum of at least 35° for the inner surface of the end portion in contact with the internal portion.

14. A composite structural component according to claim 1, wherein the angle $\theta$ to the axis increases to a maximum of at least 45° for the inner surface of the end portion in contact with the internal portion.

15. A composite structural component according to claim 1, wherein the angle $\theta$ to the axis increases to a maximum of up to 80° for the inner surface of the end portion in contact with the internal portion.

16. A composite structural component according to claim 1, wherein the angle $\theta$ to the axis increases to a maximum of up to 85° for the inner surface of the end portion in contact with the internal portion.

17. A method of forming a mechanical joint in a composite structural component comprising an elongate member made of a polymer matrix composite material, the elongate member comprising a main portion extending along an axis and an end portion with an inner surface extending from the main portion to an open end of the member, the method comprising:

providing an internal portion of an end fitting with an outer surface extending towards the axis at an increasing angle $\theta$ to the axis;

forming the inner surface of the end portion to extend towards the axis at the increasing angle $\theta$ to the axis, in contact with the outer surface of the internal portion, so that the internal portion is positioned captive within the elongate member;

providing an external portion of the end fitting in contact with an outer surface of the end portion; and tightening a part of a separate adjustable fastener that extends axially between the internal and external portions against an external surface of the external portion opposite the outer surface of the end portion so as to clamp the end portion between the internal and external portions with a clamping force having a normal component in line with the axis.

18. A method according to claim 17, wherein forming the inner surface of the end portion in contact with the outer surface of the internal portion comprises winding reinforcing fibres or filaments around the internal portion.

19. A method according to claim 17, wherein tightening the adjustable fastener comprises: applying a preload of through-thickness compression to the end portion.

\* \* \* \* \*